April 3, 1934.   A. H. FETTERS   1,953,399
PISTON VALVE
Filed July 26, 1932   2 Sheets-Sheet 1
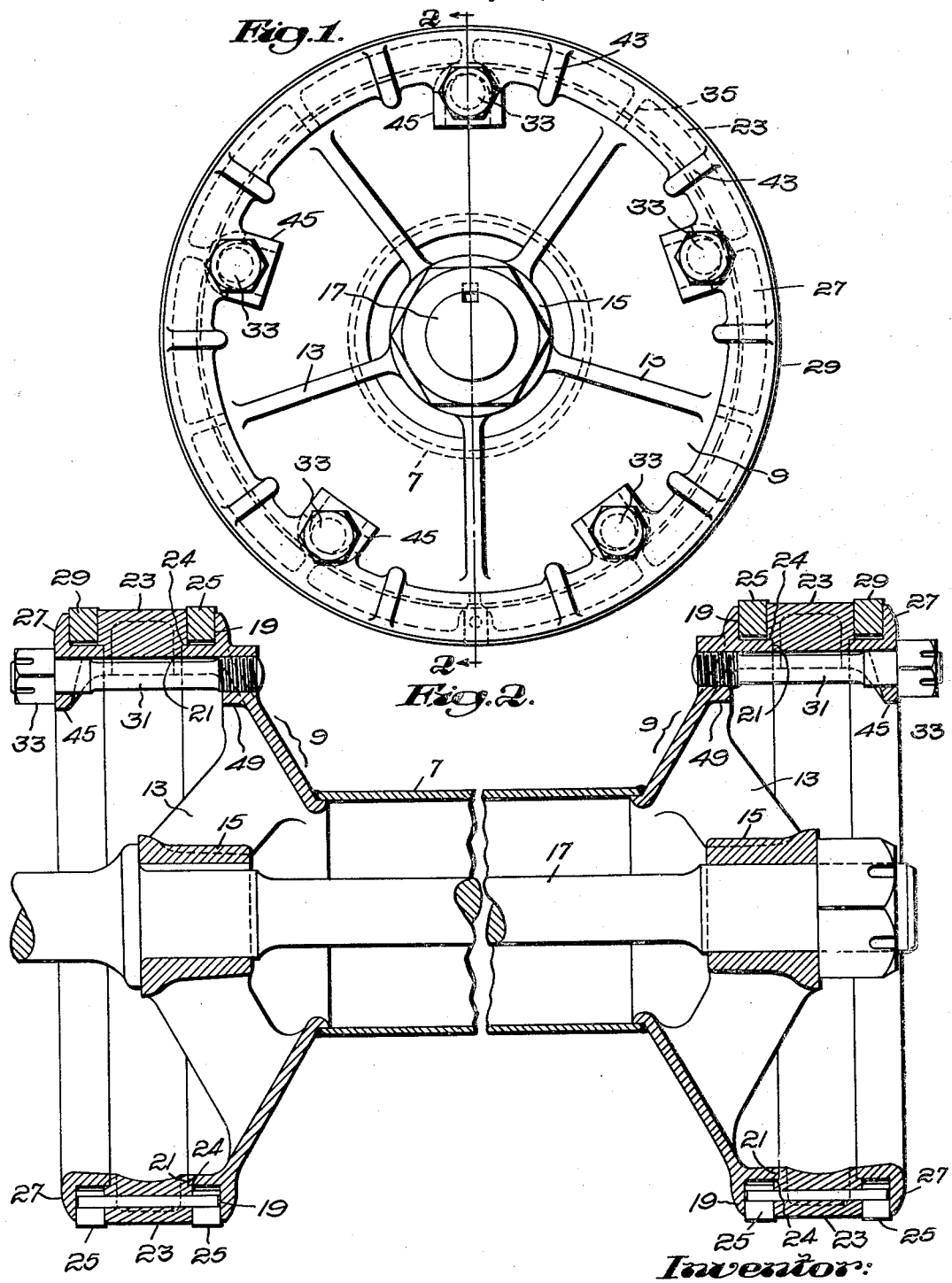
Inventor:
Arthur H. Fetters.
by Emery, Booth, Varney & Townsend
Attys

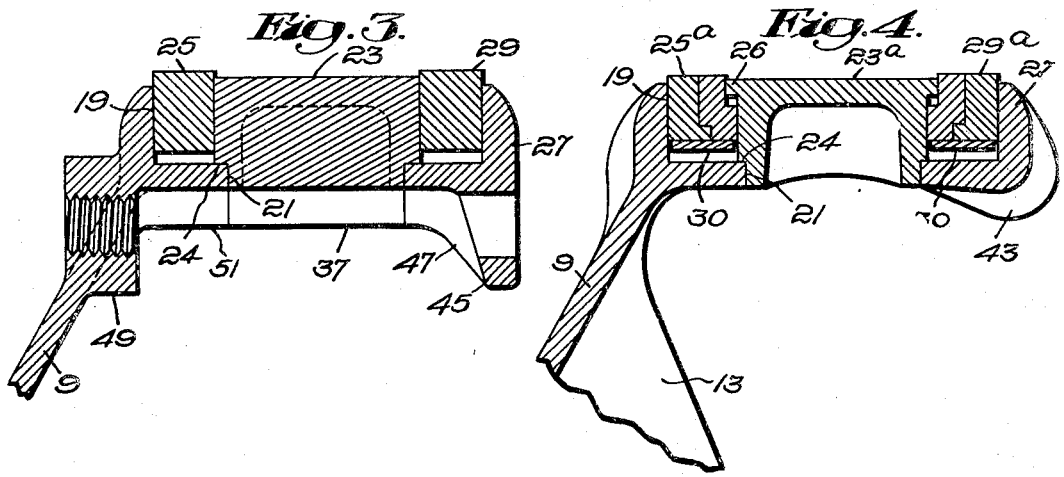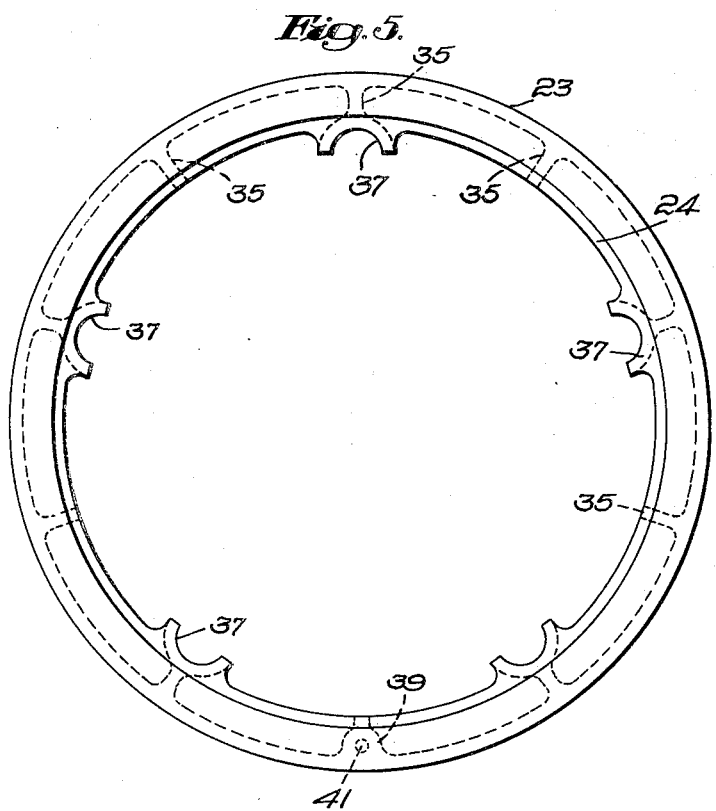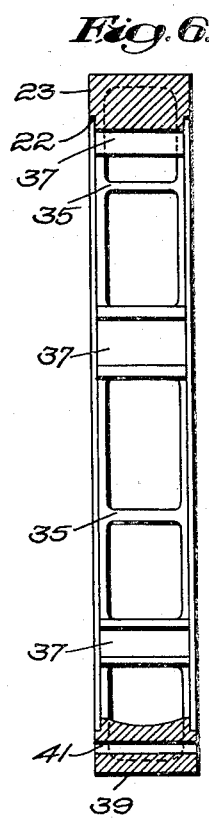

Patented Apr. 3, 1934

1,953,399

UNITED STATES PATENT OFFICE 1,953,399

PISTON VALVE

Arthur H. Fetters, Omaha, Nebr., assignor to Hunt-Spiller Manufacturing Corporation, Boston, Mass., a corporation of Massachusetts Application July 26, 1932, Serial No. 624,815

1 Claim. (Cl. 121—193)

This invention relates to piston valves such as are used in locomotive practice and the primary object is to provide an improved construction of valve which will be considerably lighter than those hitherto known. By the provision of a lighter valve the well known effect of inertia in producing rapid wear on the pins and bushings of the valve motion is minimized. Economy in construction is also provided in that the amount of machine work necessary to finish the valve is much reduced.

My invention will be well understood by reference to the following description of an illustrative embodiment thereof shown by way of example in the accompanying drawings, wherein:—

Fig. 1 is an end view of the valve;

Fig. 2 is a section on the line 2—2 of Fig. 1, partly broken away, and simplified by the omission of certain parts which would be seen in elevation;

Fig. 3 is an enlarged section corresponding to the upper right hand portion of Fig. 2 with a part omitted;

Fig. 4 is a similar section at a different location and showing other forms of bearing rings;

Fig. 5 is an end elevation of the bull ring shown in Fig. 3; and

Fig. 6 is a section thereof.

Referring to Fig. 2 of the drawings, the valve there shown by way of example comprises a spool-like body, herein shown as embodying a cylindrical section 7 formed of a suitable length of steel tubing terminally welded to cast spiders 9 which may comprise the outwardly flaring flanges 11 supported by the inwardly inclined arms 13 from hubs 15 mounted on the piston rod 17. The spiders 9 are suitably formed to receive at their ends the bearing rings, by which term I include the bull ring and packing rings of any suitable form. For this purpose they may be provided with substantially radial seats at their outer ends, and I have herein shown an inner radial shoulder 19 of relatively great diameter and an outer radial shoulder 21 of relatively smaller diameter. The bull ring 23 may seat against the shoulder 21 and may have an overhanging portion 24 extending toward the shoulder 19, and between the bull ring 23 and the shoulder 19 I have herein shown a packing ring 25 of the snap type. The bull ring as a whole is disposed outwardly of the seats and does not rest on any flange bearing opposing its inner face. To secure the bearing rings in position they may be clamped against the spiders by substantially axially acting means preferably organized independently of the piston rod 17. Herein I have shown clamping rings 27 provided with shoulders similar to the shoulders 21 and 19 for similarly engaging the bull ring 23 and a companion packing ring 29. The ring 27 is suitably pressed toward the spider 9 to clamp and thereby suspend the bull ring between them and I have herein shown a series of bolts 31 which may be threaded and riveted in the spider 9 and passed through suitable openings in the ring 27 to receive the nuts 33.

The construction of bull ring may vary as may the number, form and arrangement of the packing rings. By way of example I have illustrated in Fig. 4 a bull ring 23a similar to the bull ring 23 but having the overhanging flanges 26 at its outer surface to accommodate the rings 25a and 29a of well known type, commonly known by the trade name "Duplex" and which are supported by the springs 30.

The sections, Figs. 3 and 4, which omit all showing of parts beyond the sectioning plane, graphically show the contrast between this construction and prior forms of valves. The suspension of the bull ring between the spider 9 and the ring 27 spaced therefrom as contrasted with the bull ring resting upon and supported at its inner periphery by a cylindrical supporting body of the customary follower is very clearly shown. The resultant saving in weight will be obvious to those skilled in the art. It is also clear that the provision of the central spool-like body to be mounted on the piston rod 17 and supported therefrom by the arms 13 of the two spiders provides a construction which may be particularly easily handled and of which the parts may be easily assembled.

The particular form of bull ring 23 herein shown (see Figs. 5 and 6) is cored out at its inner side, leaving the reinforcing bridges 35, certain of which may be inwardly extended to provide depending arcuate portions 37 which may be aligned with and partially embrace the bolts 31. At the bottom of the ring one of the bridges, as 39, may be enlarged and provided with a hole 41 to receive a dowel pin, the ends of which project to position the packing rings 25 and 29 in the customary manner.

The clamping ring 27 here shown has reinforcing ribs 43 at intervals and depending lugs 45 to receive the bolts 31, which lugs are reinforced by the ribs 47. The spider shown is provided with suitable pads 49 tapped to receive the ends of the bolts. Ribs 51 extending from these pads serve to strengthen the flange formed between the shoulders 19 and 21.

I am aware that the invention may be embodied in other specific forms without departing from the spirit or essential attributes thereof, and I therefore desire the present embodiment to be considered in all respects as illustrative and not restrictive; reference being had to the appended claim rather than to the foregoing description to indicate the scope of the invention.

I claim

In a piston valve, in combination, a central spool supported from the piston rod and presenting at its ends substantially radial seats, bull rings comprising each an extended annular bearing surface and depending flanges disposed as a whole outwardly of the ends of said spool and having one of their flanges received against said seats, open-centered follower rings outward of the bull rings and cooperating with the other flanges and annularly arranged sets of bolts for drawing together spool and follower rings with the bull rings interposed between and spacing the same to clamp the bull rings and thereby suspend them, the bull ring and one of the clamping parts defining a groove for a packing ring.

ARTHUR H. FETTERS.